Dec. 12, 1961    A. L. MORLIK    3,012,638
CABLE BRAKED STEERED RUNNING GEAR ASSEMBLIES
Filed Aug. 5, 1959    4 Sheets-Sheet 2
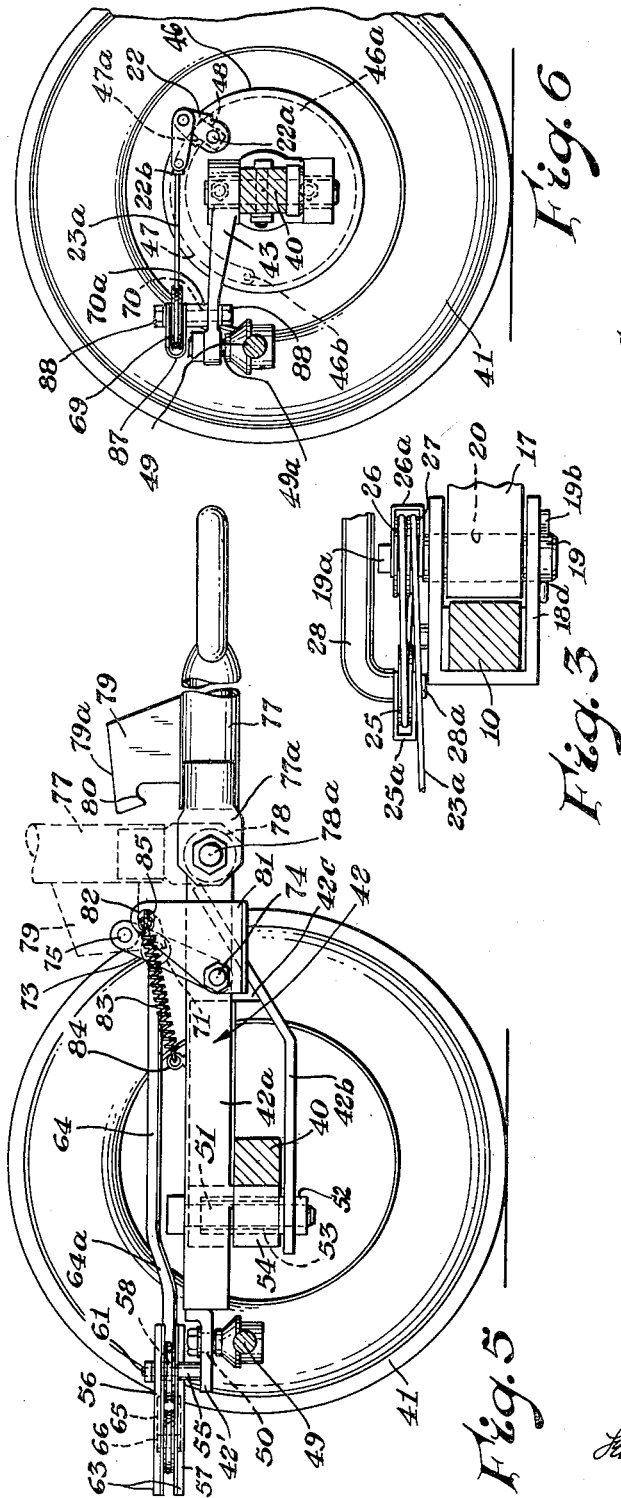
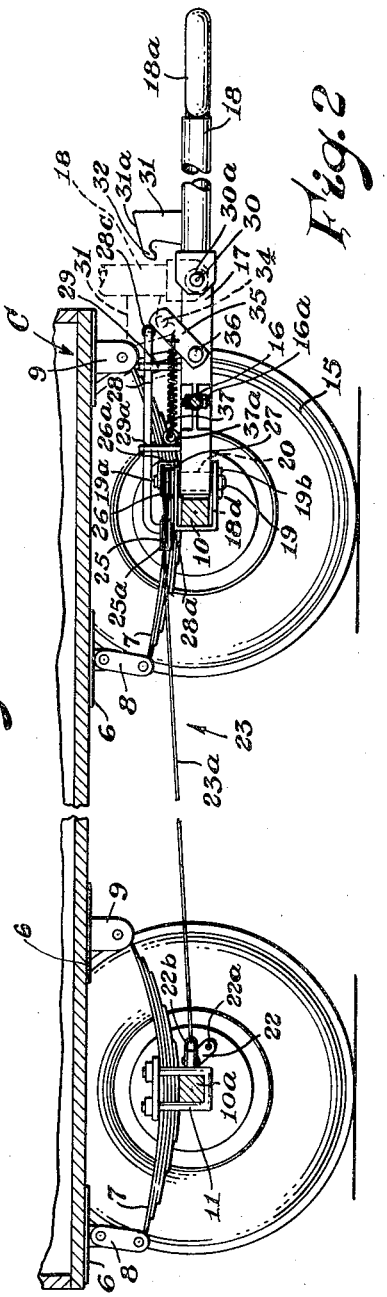
INVENTOR.
Andrew L. Morlik
BY
Farman, Farman, & McCulloch
ATTORNEYS

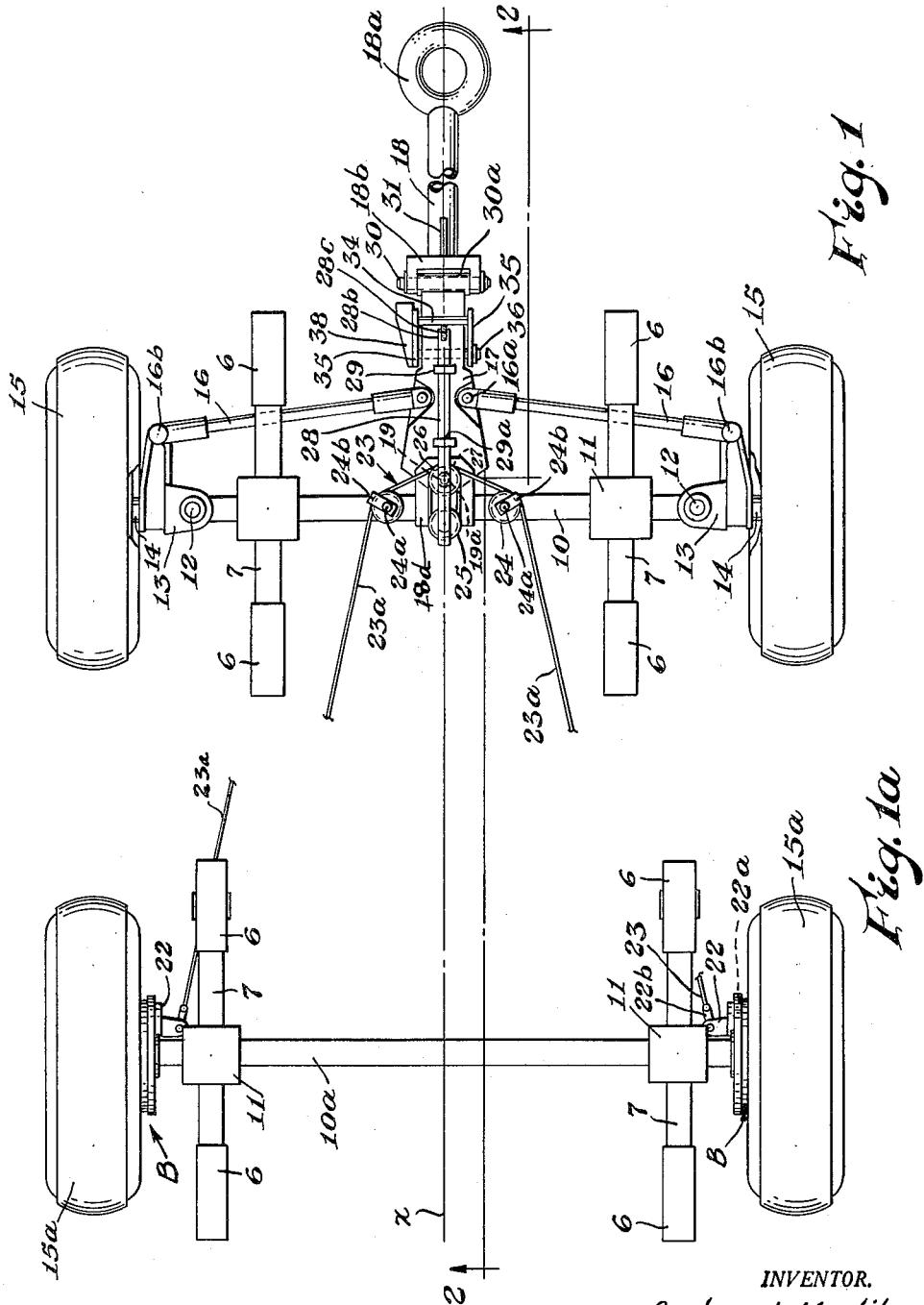

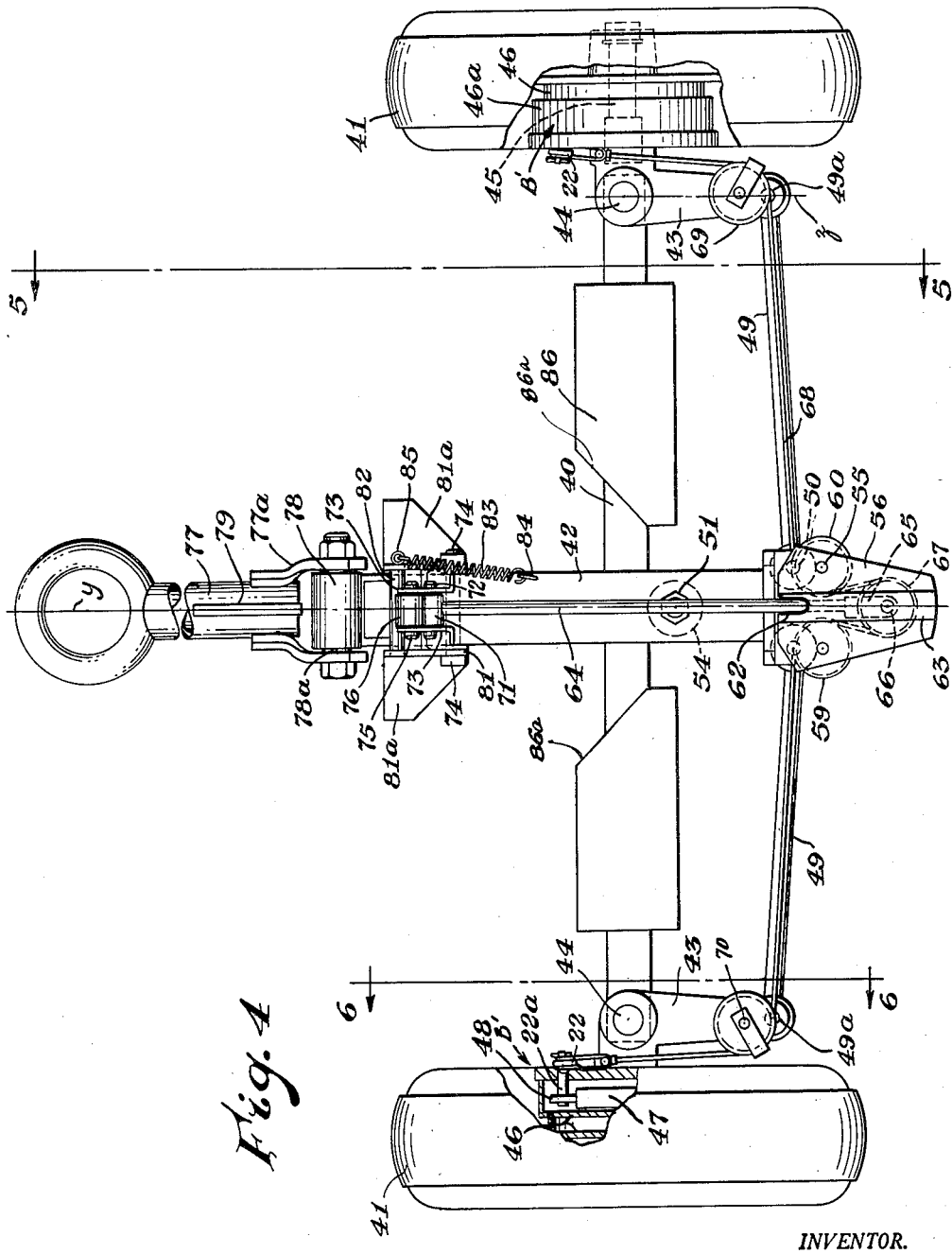

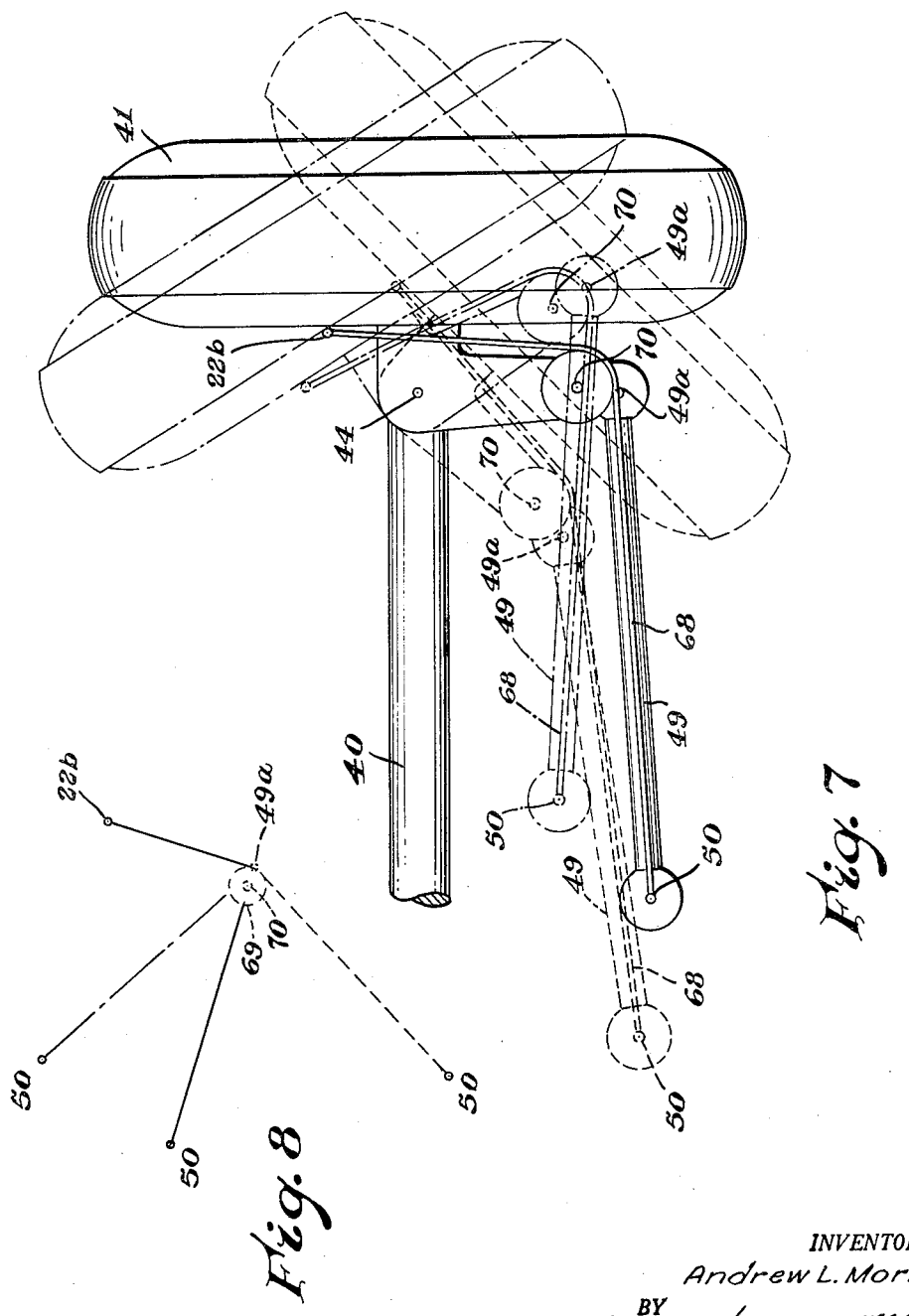

United States Patent Office 3,012,638
Patented Dec. 12, 1961

3,012,638
CABLE BRAKED STEERED RUNNING
GEAR ASSEMBLIES
Andrew L. Morlik, Saginaw, Mich., assignor to Saginaw Products Corporation, Saginaw, Mich., a corporation of Michigan
Filed Aug. 5, 1959, Ser. No. 831,742
14 Claims. (Cl. 188—192)

This invention relates to cable braked, running gear assemblies and more particularly to steerable running gear assemblies of the type employed for draft vehicles having tow bars which are actuatable to set and lock cable controlled parking brakes. It is a requisite of cable braked assemblies of this character that the cable length be unaffected by the steering angles which the wheels assume as they track the towing vehicle ahead. Otherwise it would not be possible to unhook the draft vehicle from the towing vehicle and effectively apply the parking brakes of the draft vehicle in any position in which its wheels happen to be turned. If the design is such that the effective cable length leading to one of the brake actuators is substantially decreased when the wheels are turned, the brake will, of course, be applied prematurely, whereas if the effective length is increased and the cable length leading to a brake actuator is slackened, the brake may not be fully applied or may not be applied at all when the brake actuator is operated.

One of the prime objects of the present invention is to provide a cable braked, steerable, running gear assembly so designed that the brakes can be applied at all of the various cramp angles which the steered wheels can assume with the same force.

A further object of the invention is to provide a mechanism of the character described wherein the cable braking system has complete freedom within the range of steering movements contemplated and the effective cable length does not change until it is desired to apply the brakes, regardless of variations in the angular relationships of the tow bar and the wheels.

A further object of the invention is to provide a cable braked, steerable, running gear assembly in which a single, exposed cable can be employed so that the seizing which occurs with the conventional, covered type brake cable having looped portions of cable near the wheels to allow for turning movements of the wheels is avoided.

A further object of the invention is to provide an assembly of the type described including a cable controlled parking brake system which may be actuated by simply moving the tow bar from its normal, horizontal position to a vertical position.

Another object of the invention is to provide an assembly as characterized which incorporates readily releasable, automatically engaged, locking mechanism for holding the tow bar in the vertical position and the brakes in applied position until it is desired to release them.

A still further object of the invention is to design a thoroughly practical and reliable running gear assembly which is of simple and durable construction and can be economically manufactured and maintained.

Other objects and advantages of the invention will be pointed out specifically or will become apparent from the following description when it is considered in conjunction with the appended claims and the accompanying drawings, in which:

FIGURE 1 is a top plan view of the front portion of a running gear assembly showing a brake applying system for braking the rear wheels of a cart having steerable front wheels;

FIGURE 1a is a top plan view of the rear portion of the running gear assembly;

FIGURE 2 is a sectional, elevational view taken on the line 2—2 of FIGURES 1 and 1a;

FIGURE 3 is a fragmentary, side elevational view of certain cable guide members on an enlarged scale;

FIGURE 4 is a top plan view illustrating a modification of the invention in which the brakes are mounted on the steerable front wheels;

FIGURE 5 is a transverse, sectional view taken on the line 5—5 of FIGURE 4;

FIGURE 6 is a transverse, sectional view taken on the line 6—6 of FIGURE 4;

FIGURE 7 is a top plan view of certain of the elements shown in FIGURE 4 with solid, broken, and diagrammatic lines indicating the straight ahead position of the wheels, and the maximum wheel cramp inside the turning radius and outside the turning radius, respectively, and FIGURE 8 is a diagrammatic view illustrating the manner in which the pins journalling the wheelside pulley members are positioned.

Referring now more particularly to the drawings and, in the first instance, to FIGURES 1 and 2, wherein one embodiment of the invention is shown, a letter C generally indicates the chassis or receptacle portion of a baggage cart of the type used by air lines to transport passengers' baggage to and from the planes and terminal. While the invention is illustrated as applied to a baggage cart of this type, it is to be understood that the drawings are only illustrative of preferred embodiments of the invention and the invention may be employed with materials handling trucks or other vehicles of varying design wherever it is desired to employ cable actuated braking means with a steerable running gear assembly.

The cart section C is supported by pairs of plate members 6 fore and aft, and leaf spring assemblies 7 at the front and rear are connected to the plates 6 in the usual manner by shackles 8 and dependent hangers or brackets 9. The front axle member 10 and rear axle member 10a have U-bolt assemblies 11 supporting the springs 7 from the members 10 and 10a, in the usual manner. Pivotally mounted at the ends of front member 10 by vertically disposed pins 12 in the usual manner are steering knuckles 13 which have stub axles 14 journaling wheels 15. The wheels 15 are steered through tie rods 16 pivotally joined to a steering tongue member 17 by vertically disposed pins 16a and to the knuckles 13 by vertically disposed pins 16b. The rear wheels 15a are not steerable in the sense that they have steering links and they are prevented from turning from their straight ahead positions with relation to rear axle 10a.

The tongue or plate 17 pivotally supports a tow bar 18 which is adapted for attachment to a towing vehicle, the tow bar 18 having the usual tow bar attachment ring 18a. Provided centrally between the front wheels 15 on the front member 10 is a channel plate 18d which pivotally mounts the tongue 17 for swinging movements in a horizontal plane by means of a vertically disposed pin member 19 which extends substantially above the plate 18d and is threaded at its upper end. The plate 18d is fixed fast to the member 10 and the pin member 19 extends through the opening 20 provided in the member 17, as shown in FIGURE 3 particularly, so that the tongue member 17 is freely pivotal on member 19. The pin 19 is on the longitudinal center line "x" of the running gear assembly midway between the wheels 15, as shown in FIGURE 1.

Each of the rear wheels 15a mounts a mechanical parking brake assembly B, which has a brake actuator bell crank link 22 with a rotatable operating shaft 22a leading into the interior of the brake which is actuated by a forward pull on the side portion 23a of a single, continuous braking cable 23 which is connected by a clip 22b to each link 22. Any conventional brake assembly can be employed and for illustrative purposes only I have shown in FIGURE 6 a brake which could be used and will be later described. The side portions 23a of cable 23 pass around guide pulleys 24 journalled by vertically disposed pins 24a, and clevis cable retainers 24b are supported by the pins 24a, as shown, and prevent the cable 23 from moving out of the pulley grooves. It is to be understood that the cable 23 passes freely between the pulleys 24 and the retainers 24b without binding. Each of the side portions of cable 23 en route to a central cable take-up pulley 25 is also trained around one of a pair of superposed, axially fixed pulleys 26 and 27 which for a purpose which will later be described are journaled on the pin 19. The superposed pulleys 26 and 27 also are provided with a clevis cable retainer 26a and the pin 19 is secured at its top by a nut 19a and at its bottom by a cotter pin 19b.

The pulley 25, which is movable forwardly and rearwardly in longitudinal alignment with the longitudinally fixed pulleys 26 and 27, is supported by a slide bar or frame 28 which extends through slide bearings 29a in bracket members 29 mounted on the steering tongue 17. The slide bar 28 has a dependent portion 28a of annular cross section journaling the pulley 25 which has a clevis retainer 25a, and a cotter pin or the like (not shown) may be employed to secure the retainer 25a and pulley 25 in position on portion 28a. At its front end, the slide bar 28 is bifurcated as at 28b and a roller member 28c is pinned within the bifurcated portion 28b and is freely revolvable therein. If the slide bar 28 is moved rearwardly from the position in which it is shown in FIGURE 1, the pulley 25 is moved rearwardly and the cable side portions 23a are shortened and apply pulls to links 22 which apply the brakes B. It will be noted that the axes of rotation of pulleys 25, 26, and 27 and the longitudinal line of reciprocation of push bar 28 fall on the line "x."

To apply the brakes, it is necessary only to swing tow bar 18 upwardly to the broken line position in which it is shown in FIGURE 2. Referring to FIGURE 1 particularly, it is seen that a pin 30 carried by the rear clevis end 18b of the tow bar 18 passes through a front bearing 30a on the tongue 17. Provided on tow bar 18, which is freely pivotal to the upright position mentioned, is a cam plate 31 which has an inclined cam surface 31a and, when tow bar 18 is swung upwardly, the cam surface 31a pushes the slide bar 28 rearwardly to apply the brakes B. The cam plate 31 has a hook portion 32 which, when the tow bar 18 is moved to upright position, engages over a pin 34 spanning a pair of plates 35 which are pivotally secured to the tongue or plate 17 by a pin 36. Provided to normally maintain the pin 34 in the position in which it is shown in FIGURE 2 is a spring 37 fixed to plate 35 which is connected at its rear end to a ring 37a fixed on the tongue 17. However, a foot operated release pedal section 38 (FIGURE 1) fixed to the one side plate 35 is provided so that the pin 34 can be readily disengaged from the hook portion 32 of the cam plate 31 when it is desired to release the tow bar 18. In the meantime, the brakes B on each of the rear wheels 21 are set and locked in position.

It is important to note that the rotatable but axially fixed pulleys 26—27 are mounted on the same axis as is the steering tongue 17 and, in fact, in the instant case on the same pin 19. Were this not the case, the cable portions 23 would not exert an equal pull on each of the links 22 when the wheels 15 were turned appreciably from longitudinal alignment with the line "x." In fact, one cable side portion 23a would be slack, so that only one of the parking brakes B could be effectively applied when desired and the other cable side portion would be taken up and its parking brake applied or partially applied at a time when the cart C was being towed. Since pulleys 26 and 27 should remain in longitudinally fixed position, the additional take-up pulley 25, which pivots about their journaling axes 19, is provided at a spaced distance rearwardly from pin 19.

In FIGURES 4–8 another embodiment of the invention is shown in which front axle member 40 supports wheels 41 and also centrally mounts a forwardly extending steering tongue 42, as shown. In the modification of the invention illustrated, only the front wheels 41 are shown. However, it is to be understood that they similarly support a baggage cart or the like which also has rear wheels as in FIGURE 2 which may or may not be steerable. Steering knuckle members 43 are pivotally supported from the front member 40 by vertically disposed pins 44 and, as shown in FIGURE 4, the levers 43 have stub axles 45 on which the wheels 41 are journaled. Each wheel 41 carries a parking brake assembly B', as previously, which has actuating link members 22 with actuator shafts 22a fast thereto and extending into the parking brake assemblies B'. As has been noted, the brake assemblies B and B', which will be assumed to be identical, are shown in one conventional form only. The assemblies are shown (FIGURES 4 and 6) as made up of a back plate 46 which is fixed on the axle and does not rotate with the wheel and a brake drum 46a which is fixed to the wheel for rotation therewith. A brake shoe 47 pivoted to the back plate 46 at 46b has a front end 47a which terminates adjacent a cam plate 48 fixed to the brake operating shaft 22a. Plainly upon counterclockwise rotation of shaft 22a and plate 48 in FIGURE 6 in response to a pull on a cable portion 23a the shoe 47 which has a lining (not shown) on its outer peripheral surface is forced into engagement with drum 46. For further reference to brakes of this type, attention is directed to page 423 of "Principles of Automotive Vehicles," Army Manual TM9–8000, published January 1956.

Tie rods 49 pivotally connected to the knuckles 43 by vertically disposed pins 49a are also pivotally connected to a rearwardly extending portion 42' of the steering tongue 42, as shown in FIGURE 5, by vertically disposed pins 50. The tongue, generally designated 42, includes a tubular top beam section 42a and an underlying member 42b welded to straps 42c which integrate it with the upper beam portion 42a. It will be seen that the beam portions 42a and portion 42b extend over and under the axle member 40 and a king pin 51, secured by a nut 52, pivotally supports the tongue 42, the kingpin 51 extending through an opening 53 provided in bearing portion 54 welded centrally on the front member 40.

Mounted on the rearwardly extending portion 42' of the tongue 42 are support pin members 55 which support spaced apart plates 56 and 57, as shown. Spanner bushings 58 provided on pins 55, journal pulley members 59 and 60, and nuts 61 threaded on the upper ends of pins 55 maintain the elements in assembled relation. The upper plate 56 has a longitudinally central slot 62 provided in its front edge and the central portion of both plates 56 and 57 is pressed outwardly to form tunnel sections 63 which accommodate and guide a brake actuating push rod 64. The rear end of the push rod 64 is provided with a clevis portion 65 mounting a pin 66 which rotatably supports a rear pulley 67. A single, continuous, flexible, braking cable 68 as before is trained around the pulleys 59, 60, and 67 in the manner indicated in FIGURE 4 and also passes around side guide pulleys 69 which are mounted for rotation on vertically disposed pins 70 (FIGURE 6) located, in a manner to be later described, in a particular position on the knuckle members 43.

At its front end the push rod 64 is provided with a bearing portion 71 which receives a pin 72 carried by a pair of side plate members 73 which are pivotally connected to the tongue 42 at 74. The upper ends of plates 73 extend above the bearing portions 71 of the push rod 64 and support a pin 75 on which a roller member 76 is freely journaled. With the rear end of push rod 64 guided by the tunnel or channel sections 63 of the plates 56 and 57, and the front end supported in the manner indicated by the plates 73, the push rod 64 is effectively supported for longitudinal fore and aft movement. It will be seen that pins 66 and 51 and rod 64 are located on the true longitudinal center line "y" of the vehicle and the push rod 64 includes an upwardly directed angular portion 64a which positively limits rearward movement of the push rod 64 on line "y" by engaging the rear marginal edge of slot 62 in the top plate 56.

The tow bar 77, which has a clevis end 77a and is pivotally connected to the front bearing 78 of tongue 42 by a pin 78a, carries similarly a cam plate 79 having a cam surface 79a and a locking hook portion 80. When the towing bar 77, which is, of course, attached to a prime mover vehicle and tracks the vehicle, is disengaged therefrom and pivoted upwardly to the position in which it is shown in diagrammatic lines in FIGURE 5, the push rod 64 is moved rearwardly and the parking brakes B' are applied. A pair of plates 81, also pivoted to the tongue 42 by pin 74, supports a lock pin 82 over which the hook portion 80 of the tow bar 77 will engage, when the tow bar 77 is pivoted to upright position, to hold the elements in braked position. A spring 83 connected between a ring 84 on the tongue 42 and eye 85 on lock pin 82 normally maintains the plates 81 in raised position to lock the tow bar 77. However, it will be seen that the plates 81 have laterally extending portions 81a forming foot pedals which permit convenient actuation of the pin 82 to release the tow bar 77.

The effective brake cable length must remain constant through all steering angles in order that both brakes B' are applied with equal force regardless of the turned or cramped position of the wheels 41. When the steering tongue 42 is turned, the angle of turn of each wheel 41 with respect to the longitudinal differs in order to avoid a scrubbing action when the vehicle is turning. The surfaces 86a on frame plates 86 limit the steering movement of tongue 42 and accordingly the maximum inside and outside "cramp" of the wheels.

It has been determined that placement of the pulleys 69 is all important to solving the problem of maintaining a constant effective cable length. Because the pulleys 69 cannot be located so that cable 68 passes over the axes 49a in all steerable positions of wheels 41, some variation in cable length by way of take-up or slacking will occur unless the pulleys 69 are located properly. In FIGURE 7 the straight ahead position is shown in solid lines, the position of maximum wheel cramp inside of the turning radius is shown in broken lines, and the position of maximum wheel cramp outside of the turning radius is illustrated by the diagrammatic lines. In the position in which the elements are shown in broken lines it will be noted that cable 68 does not pass over the axis 49a. In FIGURE 8 the method of solving the problem of how to position pulleys 69 is illustrated. Pulleys 69, as has been noted, are journaled for rotation on pins 70 and bushings 70a are shown for supporting pulleys 69. Cable retainer clips 87 are also supported by the pins 70 which are secured by nuts 88, as shown. It will be assumed for purposes of illustration only that the maximum angle to which the tongue and tow bar can be turned with relation to the longitudinal line "y" is 47°, and that the maximum wheel cramp inside the turning radius is 45°, and the maximum wheel cramp outside the turning radius with relation to a transverse line perpendicular to line "y" is 31°. Accordingly, when one wheel 41 is at an angle of 45° with respect to transverse member 10, the other wheel will be at an angle of 31° with respect thereto. Solution of the problem commences with the recognition that each part of the cable 68 must remain of the same effective length from point 50 to the point of connection to clip 22b regardless of the cramped condition of the wheel, in order for the brakes to be properly applied when the tow bar 77 is lifted. This means that the pulleys 69 must be so positioned that the greater or decreased length of the transversely extending portions of the cable is exactly compensated by the decreased or greater length of the remaining portions of the cable to points 22b. It is seen that the axes of pulleys 69 in properly oriented position are displaced slightly outward of a line "z" (FIGURE 4) connecting the axes of pins 49a and 44 and this shifting off center is necessary in order that the desired result will be obtained. In FIGURE 8, the length from point 49a to point 22b is laid out to scale and then the remaining length of the cable from points 22b to 50 in FIGURE 4 is laid out to scale at the various angles illustrated in FIGURE 7. A cable or line of the length 50 to 22b in accordance with the scale selected and a pulley of a diameter in accordance with the scale selected are then employed with the line anchored at one end at point 22b and passing around the pulley. The pulley is moved until it is so positioned that the opposite terminal end of the anchored line falls on each point 50 when the line is tested at the angles shown. The position for the axis of pin 70 will then be known and if the wheels are placed in straight ahead position as shown in FIGURE 4, an opening to accommodate the pin 70 can be drilled through knuckle 43 at the proper point. Arcs taken through the point located about point 22b as a center and about point 49a as a center in a full size drawing of the parts will correctly locate the proper axis for pin 70 at the intersection of the arcs.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

I claim:

1. In a cable braked running gear assembly for steerable vehicles and the like; frame means including transversely extending axle means with ground engaging, longitudinally disposed wheel members at opposite ends thereof; brake means for each of said wheel members, including brake actuator members at said wheel members; steering tongue means, extending longitudinally in normal position, pivotally mounted by said frame means for swinging movements in a generally horizontal plane; a longitudinally disposed push frame carried by said tongue means for reciprocating fore and aft movement in a longitudinal plane transversely centrally of said wheel members and brake actuator members when the former are in longitudinal, straight ahead alignment; cable means connected at its ends to said actuators; a take-up member around which said cable means is trained, mounted by said push frame and longitudinally reciprocable therewith from a normal position to a cable take-up position; guide means between said take-up member and actuators guiding said cable means to prevent a pull on one end of the cable and a slackening of the other when the said steering tongue is turned out of longitudinal alignment to steer the running gear assembly and a tow bar secured to said tongue movable from a position out of operative engagement with said push frame to a position displacing said push frame and guide member and thereby drawing the ends of said cable and actuating said brake actuator members.

2. The combination defined in claim 1 in which said guide means includes a pair of superposed pulleys journaled on said tongue means in axial alignment with the pivotal mount of said tongue means on said frame, the portions of said cable leading from said take-up member being trained one around each of said superposed pulleys.

3. The combination defined in claim 1 in which said wheel members are mounted on steering knuckle members carried by said axle means; tie rods connecting said steering knuckle members and tongue means to move said wheel members between positions of inside turn and outside turn with respect to the longitudinal; and said guide means includes transversely spaced guide pulleys journaled on said steering tongue means where said tie rods connect and around which each portion of said cable leaving the said take-up member passes en route to said brake actuator member; and a guide pulley on each steering knuckle around which each end of the cable passes axially positioned so that the length of the cable from each of the transversely spaced pulleys to the bracket actuator members is constant through all steering angles.

4. The combination defined in claim 1 in which said tow bar is pivotally mounted for swinging movement upwardly in a vertical plane and has a cam plate thereon with an inclined surface for operative engagement with said push frame.

5. The combination defined in claim 4 in which vertically pivotal arms on said tongue means support a cross pin and a hook-shaped portion is provided on said cam plate for engagement over said cross pin when the tow bar is swung upwardly.

6. The combination defined in claim 1 in which latch means on said tow bar is releasably engageable with said tongue means for holding said push frame in brake applying position.

7. In a steerable vehicle undercarriage having a cable braking system; frame means including transversely extending front and rear axle members; a wheel member supported on the end of each axle member; brakes on at least two of said wheel members having exposed brake actuator members; a cable for actuating said actuator members having its ends connected thereto; a steering tongue; means pivotally mounting said tongue on said frame means transversely intermediate said wheel members for swinging movements in a generally horizontal plane; steering link means connecting at least a pair of said wheel members to said steering tongue for actuating said wheel members to turned positions; a cable take-up member mounted for pivotal movement with said tongue transversely intermediate said wheel members for fore and aft movement longitudinally; guide means between said take-up member and actuators guiding said cable to prevent a pull on one end of the cable and a slackening of the other when the steering tongue is in turned position out of longitudinal alignment; and a member for actuating said cable take-up member regardless of the different turned position of said pair of wheels.

8. In a cable braked, steerable, running gear assembly; frame means including transversely extending front and rear axles; wheels supported by said axles at their ends; a steering tongue pivotal on said frame means for swinging movements in a generally horizontal plane; steering knuckles pivotal on one of said axles for journaling a pair of said wheels; tie rod means pivotally connected to said knuckles and to said tongue for steering said wheels according to pivotal movements of said steering tongue; brake assemblies carried by a pair of said wheels; actuators for said brake assemblies; cable means connected at its ends to said actuators; a cable means take-up member, including a part around which said cable means is trained, movable longitudinally relative to said steering tongue between a cable means take-up position and a normal position; and means located between said take-up means and actuators guiding said cable means, when the said steering tongue is turned to steer the running gear assembly, to prevent a pull on one end of the cable and a slackening of the other.

9. The combination defined in claim 8 in which said part comprises a horizontally disposed pulley; a pin pivotally mounting said steering tongue on the frame means; and said latter means guiding said cable comprises a pair of pulleys mounted one on top of the other on said pin; said cable passing around said pulley and each cable portion leading from a side of said pulley passing around one of said superposed pulleys en route to one of said brake actuators.

10. The combination defined in claim 8 in which said cable take-up member part comprises a first horizontally disposed pulley; said tie rod means includes a tie rod connected between each knuckle and the tongue; and said latter means guiding said cable comprises a first pair of spaced, horizontally disposed pulleys to guide said cable as it comes from said first pulley positioned to pass said cable over the pivotal connections of said tie rods to said steering tongue; and a second pair of horizontally disposed pulleys on said steering knuckles positioned so that the cable lengths between the pivotal connections of said tie rods and tongue and said actuators do not change with steering movements of said tongue.

11. In a cable braked running gear assembly for steerable vehicles and the like; frame means including transversely extending axle means with ground engaging, longitudinally disposed wheel members at opposite ends thereof; brake means for each of said wheel members, including brake actuator members at said wheel members; steering tongue means, extending longitudinally in normal position, pivotally mounted by said frame means for swinging movements in a generally horizontal plane; cable means connected at its ends to said actuators; a cable means take-up means, including a part around which said cable means is trained, pivotal with said tongue means and mounted for fore and aft movement longitudinally, transversely intermediate said wheel members and brake actuator members when the former are in longitudinal, straight ahead alignment, from a normal position to a cable means take-up position in which the ends of the cable means are drawn to operate the brake actuator members; and guide means between said take-up means part and brake actuator members guiding said cable means to prevent a pull on one end of the cable and a slackening of the other when the said steering tongue is turned out of longitudinal alignment to steer the running gear assembly.

12. A method of mounting a cable braked steering assembly having turnable, brake incorporating, axled wheels with steering knuckles and brake actuators thereon connected with a steering tongue by rods, including the steps of; mounting cable take-up means longitudinally centrally of the axle; laying out the angles of maximum and minimum cramp of one of the wheels utilizing a predesignated constant length of cable; and positioning a guide pulley on said steering knuckle with its periphery such that the predesignated length of cable attached to the brake actuator and passing around the pulley will in each position reach the designated point of connection with the take-up means.

13. The combination defined in claim 12 in which parts corresponding to the cable take-up means, wheel, guide pulley, steering knuckle, cable, and brake actuator are used according to a reduced scale.

14. The combination defined in claim 11 in which said wheel members are pivotally mounted for steering movements out of longitudinal disposition; and tie rod means connects said steering tongue means with said wheel members for imparting steering movements thereto.

References Cited in the file of this patent

UNITED STATES PATENTS

| | | |
|---|---|---|
| 241,193 | Cronin | May 10, 1881 |
| 580,881 | Monaghan | Apr. 20, 1897 |
| 775,638 | Stewart | Nov. 22, 1904 |
| 779,011 | Stuart et al. | Jan. 3, 1905 |
| 804,071 | Troop | Nov. 7, 1905 |
| 877,009 | Smith | Jan. 21, 1908 |
| 1,153,967 | Smith | Sept. 21, 1915 |
| 1,931,481 | Amorisi | Oct. 24, 1933 |
| 2,169,781 | Abresch | Aug. 15, 1939 |
| 2,336,642 | Schreck | Dec. 14, 1943 |
| 2,902,121 | Young et al. | Sept. 1, 1959 |

FOREIGN PATENTS

| | | |
|---|---|---|
| 101,105 | Austria | Sept. 25, 1925 |
| 6,581 | Switzerland | Apr. 29, 1893 |